United States Patent

[11] 3,587,923

| [72] | Inventors | Tamotsu Tanaka<br>Hirakata-shi;<br>Syozi Hara, Kadoma-shi, Japan |
|---|---|---|
| [21] | Appl. No. | 828,239 |
| [22] | Filed | May 27, 1969 |
| [45] | Patented | June 28, 1971 |
| [73] | Assignee | Matsushita Electrical Co., Ltd.<br>Osaka, Japan |
| [32] | Priority | May 31, 1968, May 31, 1968, May 31, 1968, July 15, 1968 |
| [33] | | Japan |
| [31] | | 43/37394, 43/37395, 43/37396 and Ut43/60832 |

[54] DEVICE FOR SIMULTANEOUSLY SEPARATING AND FEEDING THREE OR FOUR GIB-HEADED RODS
10 Claims, 17 Drawing Figs.

| [52] | U.S. Cl. | 221/224 |
|---|---|---|
| [51] | Int. Cl. | B65h 5/00, G07f 11/16 |
| [50] | Field of Search | 221/278, 224, 225 |

[56] References Cited
UNITED STATES PATENTS

| 3,297,199 | 1/1967 | Law | 221/224X |
|---|---|---|---|
| 3,457,691 | 7/1969 | Rogge | 221/278X |

*Primary Examiner*—Raphael H. Schwartz
*Attorney*—Stevens, Davis, Miller & Mosher ABSTRACT: A device which separates three or four gib-headed rods such as machine screws, bolts, rivets, etc. from a series of gib-headed rods arranged on a supply chute by a reciprocating guide plate having oblique guide grooves, distributes them individually to respective fall openings by a reciprocating distributing means having notched and shouldered portions for receiving them, and simultaneously discharges them from the fall openings to respective transfer pipes via a shutter plate, wherein the guide plate, distributing means and shutter plate are simultaneously reciprocated by a common power piston means so as to simultaneously feed three or four gib-headed rods to, for example, the head of a multiscrewdriver in each reciprocating cycle of operation.

Tamotsu Tanaka
and
Syozi Hara
INVENTOR

By Stevens, Davis, Miller & Mosher
ATTORNEYS

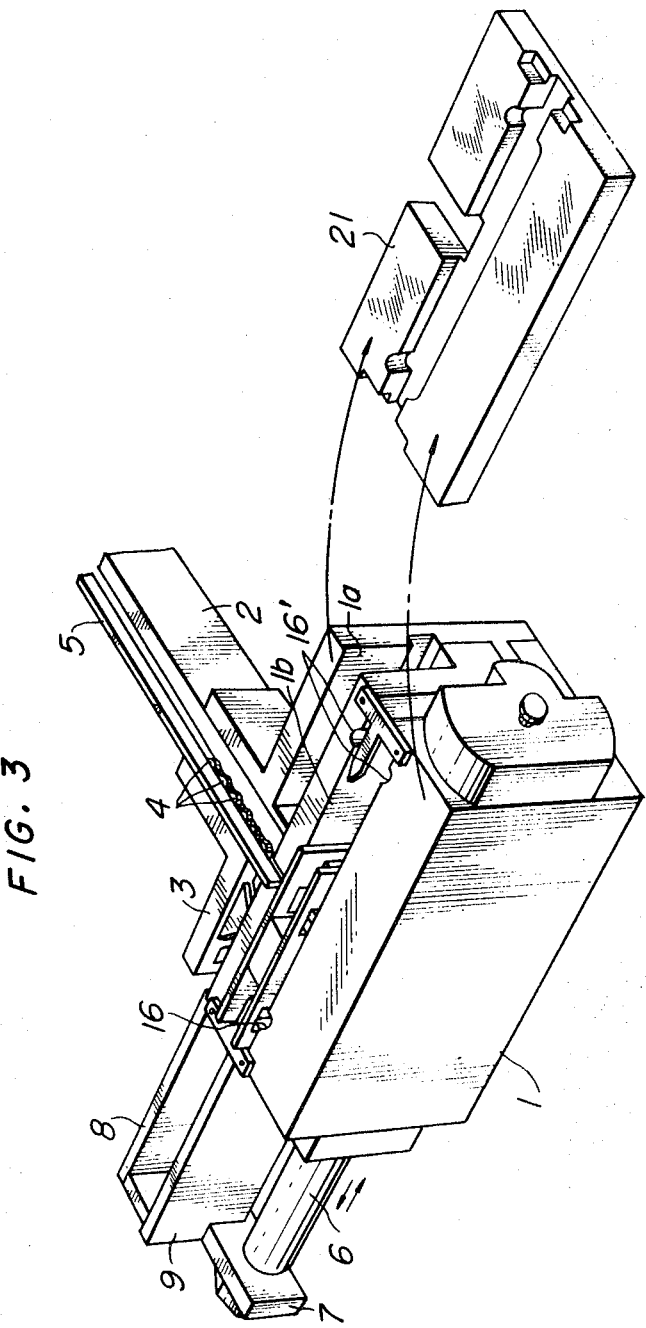

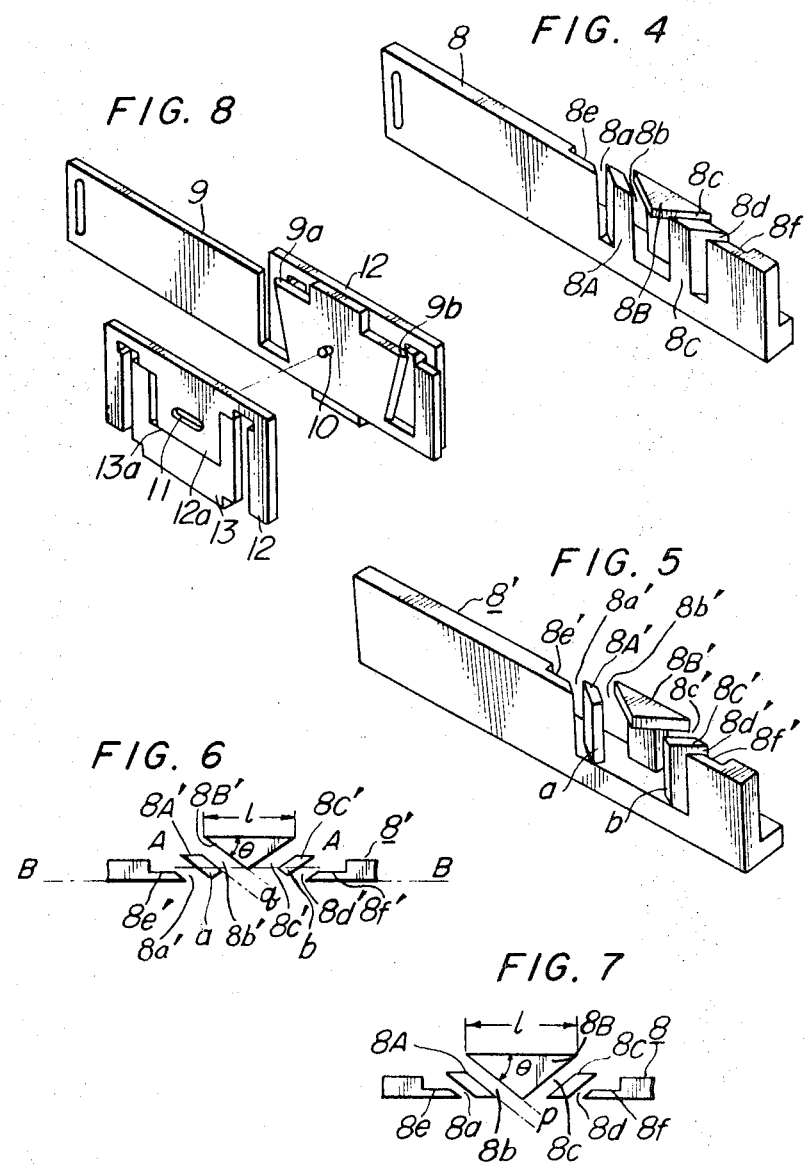

3,587,923

DEVICE FOR SIMULTANEOUSLY SEPARATING AND FEEDING THREE OR FOUR GIB-HEADED RODS

BACKGROUND OF THE INVENTION

1. Field of the Invention

This invention relates to a device for simultaneously separating and feeding three or four gib-headed rods especially intended for use as a unit in an assembling machine, whereby three or four gib-headed rods such as machine screws are separated from a series of gib-headed rods arranged on a linear chute and transferred through corresponding number of pneumatic pipes to, for example, the head of a multiscrewdriver to be simultaneously mounted to required positions.

2. Description of the Prior Art

In conventional devices for the above-mentioned purpose, it was only possible to separate and feed one or two gib-headed rods at a time. Therefore, when it was required to simultaneously feed three or four gib-headed rods, it was necessary to arrange two or more units in parallel, with the same number of chutes and feeders for supplying the gib-headed rods to the chutes. However, such a parallel arrangement of the units makes the structure of an assembling machine complicated, increases the cost of the machine, and deteriorates the compactness of the machine, requiring a larger space for the mounting thereof.

SUMMARY OF THE INVENTION

Accordingly, the main object of this invention is to provide a device which can separate three or four gib-headed rods at a time from a series of gib-headed rods arranged on a chute, distribute them individually to three or four discharging stations, and simultaneously feed them through respective transfer pipes to respective mounting positions.

Another object of this invention is to provide a device for simultaneously separating and feeding three or four gib-headed rods, which has a simple and compact structure and is economical in manufacture and mounting.

Still another object of this invention is to provide a device for simultaneously separating and feeding three or four gib-headed rods, which is operated by a simple power piston means which reciprocates a guide means and a distributing means in cooperation to separate and distribute three or four gib-headed rods to individual discharging stations in each cycle of reciprocation.

Still another object of this invention is to provide a device for simultaneously separating and feeding three or four gib-headed rods, which can deal with gib-headed rods of different rod diameters by merely changing the guide means.

Still another object of this invention is to provide a device for simultaneously separating and feeding three or four gib-headed rods, which operates positively to supply a predetermined number of separated gib-headed rods to respective mounting positions.

According to this invention, these objects are accomplished by a device for simultaneously separating and feeding three or four gib-headed rods comprising a chute for successively supplying a series of gib-headed rods, a guide means for separating three or four gib-headed rods in each cycle of operation from said series of gib-headed rods, a distributing means for distributing said three or four gib-headed rods individually to respective discharging stations in each cycle of operation, and a discharging means for simultaneously discharging said three or four gib-headed rods from said discharging stations to respective transfer pipes at the end of each cycle of operation.

In an aspect of this invention, said guide means is a guide plate adapted to be reciprocated across the chute and provided with three or four oblique grooves for guiding the gib-headed rods therethrough from one side of said plate to the other side thereof along the chute, whereby a predetermined number of gib-headed rods are positively separated from the source thereof in each cycle of reciprocation of the guide plate.

The guide plate may be provided with additional oblique surfaces other than the walls of said grooves adapted to additionally feed the gib-headed rods along the chute after said rods have come out of engagement with the grooves, whereby even when the lengths of the grooves are shortened because of a larger groove width to deal with gib-headed rods of a larger rod diameter, it is guaranteed that the gib-headed rods are positively guided from one side to the other side of the guide plate, while keeping a small stroke length of reciprocation for the compactness of the unit.

In another aspect of this invention, said distributing means comprises a distributing plate adapted to be reciprocated across a discharge end of the chute and provided with two notches each adapted to meet with the discharge end when the distributing plate is at each stroke end position. On both sides of the distributing plate are slidably mounted a pair of carrier plates so that a predetermined slight movement is allowed between the distributing plate and the carrier plates in the direction of reciprocation and a pair of auxiliary carrier members which are adapted to cooperate with the carrier plates with an allowance for a slight relative movement with respect to the carrier plates in the direction of reciprocation to define a shouldered portion for receiving and suspending at most two gib-headed rods at each said notched portion when the notched portion has come in alignment with the discharge end of the chute. The notched portions are each defining a V-shaped edge adapted to wedge in the two gib-headed rods received in the shouldered portion to separate them from each other when the distributing plate is moved from each stroke end position due to the relative displacement between the distributing plate and the carrier plates. After the V-shaped edge has wedged in and separated the gib-headed rods so that they are individually suspended along the edges of a groove through which the distributing plate is reciprocated, the shouldered portion disappears due to the relative displacement between the carrier plates and the auxiliary carrier members. By this structure of the distributing means, the gib-headed rods separated by the guide means are positively received in the shouldered portions every time when they meet with the discharge end of the chute, positively separated from each other by the wedging-in action of the V-shaped edges, and positively transferred to respective discharging stations by the stroking action of the distributing plate, wherein the disengagement of the gib-headed rods from the distributing plate at the discharging station is facilitated because the shouldered portion has disappeared in advance of the disengagement.

The discharging stations may be fall openings provided along the way of reciprocation of the distributing plate, each being adapted to receive one of the gib-headed rods received in the notched portion of the distributing plate when the plate has come to a stroke end. The gib-headed rods received in the notched portion are positively driven out of the notched portion by a V-shaped guide piece at the discharging stations to be dropped into the fall opening.

The fall openings are each connected with a transfer pipe via a shutter plate. The transfer pipes are each preferably provided with a compressed air inlet so that the gib-headed rod introduced into it when the shutter plate was opened is pneumatically transferred while the shutter plate is closed.

In still another advantageous aspect of this invention, the guide plate, the discharging plate and the shutter plate are firmly connected to a common piston to be simultaneously reciprocated by a single power piston means to a great simplicity of structure.

BRIEF DESCRIPTION OF THE DRAWINGS

In the accompanying drawings;

FIG. 3 is the same view as FIG. 1, but the cover plate is removed to show the device in more detail;

FIG. 4 is a perspective view of a guide plate for separating four gibrheaded rods of a normal or smaller rod diameter;

FIG. 5 is a perspective view of a guide plate for separating four gib-headed rods of a larger rod diameter;

FIG. 6 is a partial plan view of the guide plate shown in FIG. 4;

FIG. 7 is a partial plan view of the guide plate shown in FIG. 5;

FIG. 8 is a partially assembled perspective view of a distributing means composed of a distributing plate, carrier plates and auxiliary carrier members;

DESCRIPTION OF THE PREFERRED EMBODIMENTS

In the following, this invention will be explained by way of some preferred embodiments with reference to the accompanying drawings.

Figure 1:
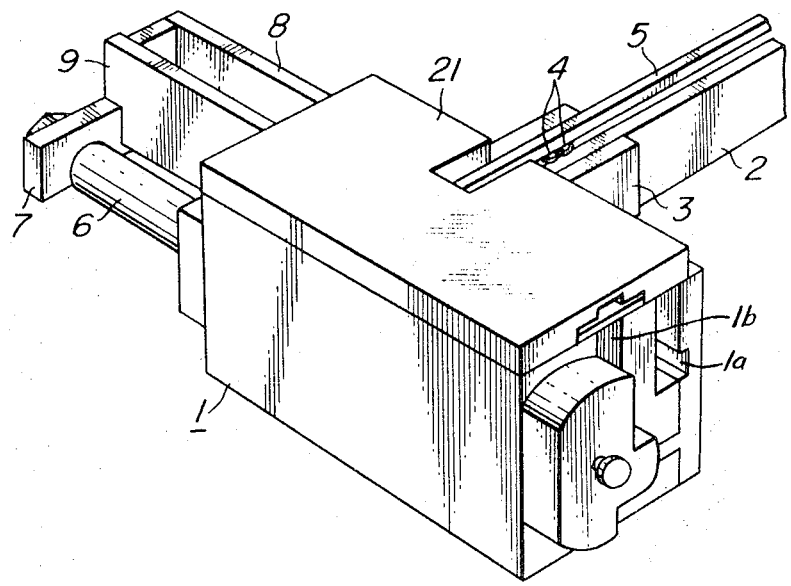
FIG. 1 is a perspective view of an embodiment of the device of this invention.
Figure 2:
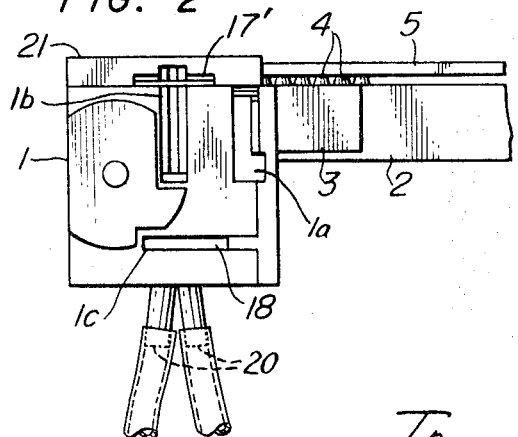
FIG. 2 is a side view of the device shown in FIG. 1.

Referring especially to FIGS. 1, 2 and 3, the device for simultaneously separating and feeding three or four gib-headed rods according to this invention includes a body 1 and a chute 2 attached to a connection portion 3 projecting sideward from the body of the device. On and along the chute 2, there are carried a number of gib-headed rods 4 such as machine screws, bolts or rivets in line and in close contact with adjacent ones due to the effect of gravity, because in operating condition the device or the body 1 is so positioned that the chute 2 is inclined about 30° with respect to a horizontal level. The gib-headed rods 4 arranged on the chute 2 are protected from being thrown out of the chute by a rail 5 extending thereover. In a cylinder provided in the body is slidably mounted a piston 6 adapted to be reciprocated by the action of compressed air, and the piston 6 reciprocates a guide plate 8 and a distributing plate 9 via a lug 7 extending transversely therefrom. The guide plate 8 is reciprocated along a groove 1a provided in the body, crossing the forward portion of the chute 2 and separates and feeds four gib-headed rods 4 toward the distributing plate 9 in each cycle of reciprocation, the latter plate being also reciprocated along a groove 1b provided in the body and distributing those gib-headed rods to four separate transfer pipes 20 during its coreciprocation with the former plate, as explained in more detail hereunder.

First, the guide plate will be explained with reference to FIGS. 4 to 7. When gib-headed rods of a normal rod diameter or of a less rod diameter are dealt with, the guide plate 8 as shown in FIGS. 4 and 7 is used, and when gib-headed rods of a larger rod diameter but of the same head diameter as the normal ones are dealt with, the guide plate 8' as shown in FIGS. 5 and 6 is used.

Referring first to FIGS. 4 and 7, the guide plate 8 is provided with four separating and guiding grooves 8a, 8b, 8c and 8d of constant width $p$ and angle of inclination $\theta$ with respect to the longitudinal axis thereof, wherein portions 8A, 8B and 8C left between the grooves constitute rod-pushing portions. At the outer sides of the grooves 8a and 8d, the guide plate 8 is formed of reduced portions 8e and 8f of the depth substantially corresponding to the rod diameter of the gib-headed rods so that the most forward gib-headed rod in the chute 2 abutting against one of the reduced portions when the guide plate is positioned at either stroke end is positively entrained into the groove 8a or 8d upon the next stroke of the guide plate. The grooves 8a and 8b forcibly separate two gib-headed rods 4 from a series of the rods carried on the chute and feed them toward the distributing plate when the guide plate is moved leftward seen in FIG. 7, and the grooves 8c and 8d forcibly separate and feed next two gib-headed rods in the same manner when the guide plate is moved rightward, as seen in FIG. 7.

The guide plate 8' shown in FIGS. 5 and 6 is almost the same as the guide plate 8, but is provided with separating and guiding grooves 8a', 8b', 8c' and 8d' of a larger width $q$ and at the same angle of inclination $\theta$. Also in this case, reduced portions 8e' and 8f' are provided at the outer sides of the grooves 8a' and 8d', the depth of which is correspondingly larger than that of the reduced portions 8e and 8f.

However, rod-pushing portions 8A', 8B' and 8C', which correspond to the same portions 8A, 8B and 8C of the guide plate 8, are somewhat different from the portions 8A—8C in that, in this case the ends of the portions 8A' and 8C' are bevelled as end faces $a$ and $b$ of the same angle of inclination $\theta$ with the grooves 8a'—8d'. Accordingly, when the guide plate 8' is moved leftward, as seen in FIG. 6, by the action of the piston 6, one gib-headed rod of a larger rod diameter is caught into the groove 8a' and forcibly fed until it reaches line B–B in FIG. 6 by the rod pushing portion 8A', and another gib-headed rod is caught into the groove 8b' and forcibly fed until it reaches line A–A by the portion 8B' and furthermore from line A–A to line B–B by the end face $b$. In the same manner, when the guide plate 8' is moved rightward, as seen in FIG. 6, the next gib-headed rod is fed until it reaches line B–B by the rod-pushing portion 8C' through the groove 8d' and the still next gib-headed rod is fed until it reaches line A–A by the portion 8B' through the groove 8c' and thereafter until line B–B by the end face $a$.

Next, the distributing plate 9 will be explained with reference to FIGS. 8 to 13. As best shown in FIG. 8, the distributing plate is formed of notches defining V-shaped and inclined gib-headed rod separating edges 9a and 9b and is provided with pins 10 projecting from both side surfaces thereof. In slidable contact with the side surfaces of the plate 9, there are provided a pair of carrier plates 12 so that the pins 10 are engaged in elongated openings 11 provided at the carrier plates, whereby an extent of relative movement between the distributing plate 9 and the carrier plates 12 is allowed, which has the effect of providing a stroke delay between the plates 9 and 12, as described hereinunder. Furthermore, a substantially U-shaped auxiliary carrier member 13 is incorporated with each carrier plate 12 in such a manner that relative axial movement is allowed between them as much extent as a clearance 14. The auxiliary carrier member 13 is guided along the lower end face of a central projection 12a of the carrier member 12 by a central portion 13a thereof, and is also in slidable contact with the side surface of the distributing plate 9.

Figure 9:
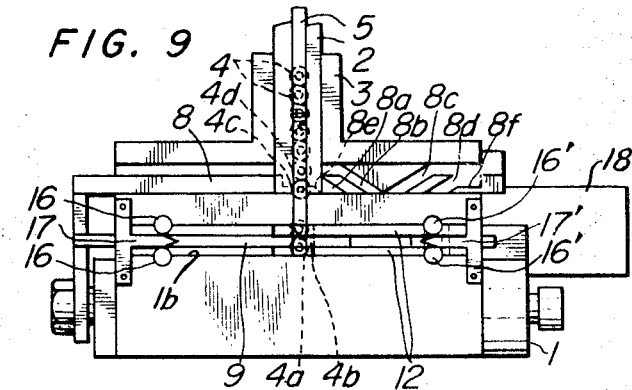
FIG. 9 is a plan view of the device shown in FIG. 1, showing the starting condition with the cover removed for the purpose of illustration.
Figure 13:
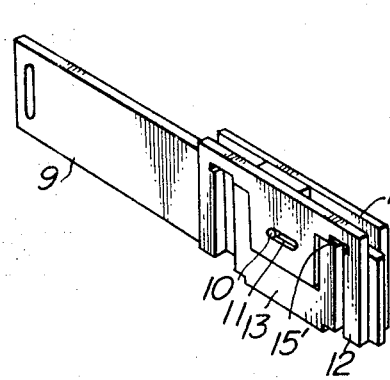
FIG. 13 is a perspective view of the distributing means in the forward stroke end condition.
Figure 10:
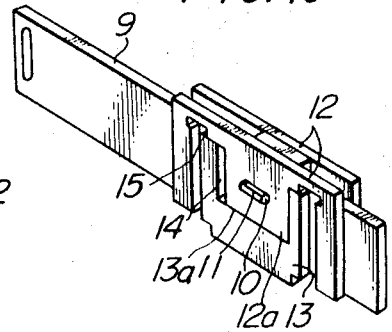
FIG. 10 is a perspective view of the distributing means in the starting condition.

When the distributing plate 9 is moved rightward, as seen in FIG. 9, the carrier plates 12 are shifted leftward with respect to the distributing plate 9 as much as the length of the openings 11, and the auxiliary carrier members 13 are further shifted leftward with respect to the carrier plates as much as the clearance 14, as shown in FIG. 10, whereby a shouldered portion 15 is provided adjacent the edge 9a of the distributing plate by the cooperation of the carrier plate and the auxiliary carrier members for suspending the gib-headed rods. Accordingly, as the distributing plate 9 is moved rightward, as seen in FIG. 9, by the action of the piston 6, two gib-headed rods are fed toward the distributing plate 9 by the above-mentioned operation of the guide plate 8 which is also moving rightward somewhat preceding the distributing plate 9, and when the shouldered portion 15 has come into alignment with the chute 2 at the end of the rightward stroke of the distributing plate, the two gib-headed rods are engaged into the shouldered portion 15 by the action of gravity, since the device is positioned with such an inclination that the chute 2 is inclined about 30° with respect to a horizontal level as described before. In the same manner, when the distributing plate 9 is moved leftward, the carrier plates 12 are shifted rightward with respect to the distributing plate, and the auxiliary carrier members are shifted rightward with respect to the carrier plates, whereby another shouldered portion 15' is provided adjacent the edge 9b of the distributing plate, as shown in FIG. 13. The shouldered portion 15' is likewise charged with the next two gib-headed rods when it has come in alignment with the chute 2 at the end of the leftward stroke of the distributing plate.

Figure 14:
FIG. 14 is a view showing the condition of two gib-headed rods when they have just been suspended on the shouldered portion.

When the distributing plate 9 begins leftward movement from the position shown in FIG. 9, wherein the two gib-headed rods 4 are suspended by the shouldered portion 15, as shown in FIG. 14, the inclined edge 9a wedges in the two gib-headed rods and keeps them separated as long as the distributing plate 9 is moved leftward. Such separation of the two gib-headed rods from the condition as shown in FIG. 14 is smoothly performed since the edge 9a (as well as 9b) is gradually sloped upwardly as seen in FIG. 8.

Reference numerals 16 and 16' designate four fall openings for the gib-headed rods provided adjacent both axial ends of the body of the device, each of the openings, however, being a mere troughlike concave in the region of the sidewall of a groove 1b in the body in which the carrier members are reciprocated. Separating guide pieces 17, 17' each having a V-shaped edge are mounted adjacent the fall openings so that the two gib-headed rods moved toward the edge by the carrier plates are wedged apart by the edge toward the respective openings 16 or 16'. The openings 16 and 16' are bored through the bottom of the groove 1b and communicate with transfer pipes 20 which transfer the gib-headed rods to respective mounting positions. Across the openings 16 and 16', there is provided a shutter plate 18 slidably mounted in a groove 1c provided along the bottom of the body 1 and adapted to be reciprocated by the action of the piston 6. The shutter plate is provided with four openings 19 (FIG. 11) which are adapted to accord with the four openings 16 and 16', respectively, when the shutter plate is at the fully inserted position as shown in FIG. 9, thereby to establish the through passages from the fall openings 16 and 16' to the transfer pipes 20. The upper end of the grooved body 1 is covered by a cover plate 21 formed of complementary grooves to house the carrier plates and other projecting means (FIG. 3). When the transfer pipes 20 are isolated from the fall openings 16 and 16' by the shutter plate 19 moved outward from the position shown in FIG. 9, or positioned practically at the outward stroke end, air is blown into the transfer pipes to pneumatically transport the gib-headed rods through the pipes, through the provisions for such operation are not shown in the drawings.

Now, the cyclic operation of the above-mentioned device will be explained in the following.

Figure 11:
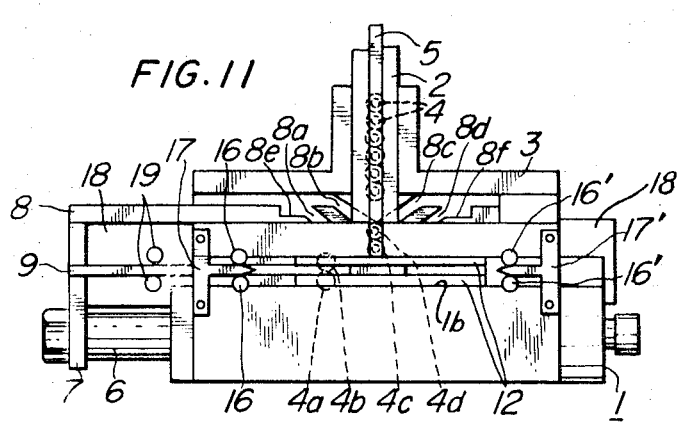
FIG. 11 is a plan view of the same kind as FIG. 9, showing an intermediate condition during the forward stroke operation.
Figure 12:
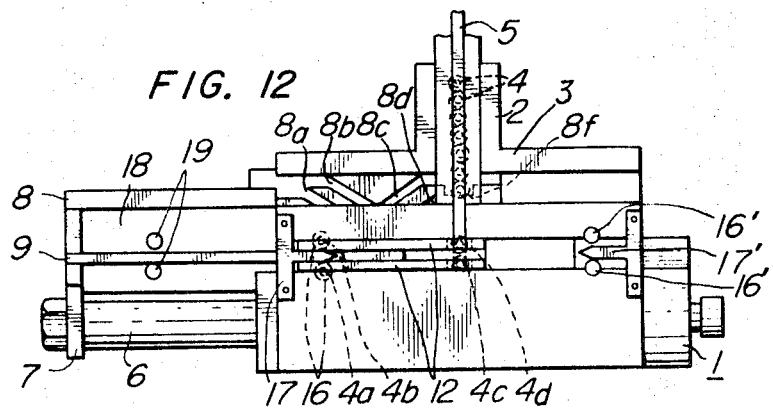
FIG. 12 is a plan view of the same kind as FIG. 9, showing the forward stroke end condition.

Starting from the condition as shown in FIG. 9, wherein the piston 6, and accordingly the guide and distributing plates 8 and 9 are at the fully inserted or retreated position, it is assumed that two gib-headed rods 4a and 4b are already suspended by the shouldered portion 15 of the carrier plates 12 after they have been guided through the grooves 8c and 8d of the guide plate 8 (or grooves 8c' and 8d' in case of guide plate 8') during the return stroke of the piston 6 in the preceding cycle of operation, and that the next or the most forward gib-headed rod 4c of a series of gib-headed rods 4 closely arranged on the chute 2 is abutting against the reduced portion 8e (or 8e' in case of guide plate 8'). When the piston 6 is moved forward or leftward, as seen in FIG. 9, from the position shown in FIG. 9 by the supply of compressed air, the two gib-headed rods 4a and 4b are separated from each other starting from the portion just below the head thereof gradually downward by the above-mentioned wedging-in action of the V-shaped edge 9a of the distributing plate 9. When the gib-headed rods 4a and 4b have been separated from each other and the pins 10 have contacted the other end of the elongated openings 11, the carrier plates 12 begin to move forward entrained by the distributing plate 9. After a slight movement of the carrier plates 12, the clearance 14 disappears and the auxiliary carrier members 13 also begin to move forward. When the clearance 14 has disappeared, the shouldered portion 15 also disappears. However, at this time the heads of the gib-headed rods 4a and 4b are already suspended by the edges of the groove 1b, and along the edges the gib-headed rods are transferred toward the fall openings 16 (FIG. 11). When the gib-headed rods 4a and 4b have just approached the fall openings 16, just before the end of the forward stroke, the separating guide piece 17 wedges between the two gib-headed rods to get them apart and dropped into the fall openings 16 with the end of the forward stroke of the piston (FIG. 12). At this time, the bottoms of the fall openings 16 are being closed by the shutter plate 18, and accordingly, the gib-headed rods 4a and 4b are supported on the shutter plate.

On the other hand, during this forward stroke of the piston 6 and accordingly the guide plate 8, the next two gib-headed rods 4c and 4d arranged on the chute 2 are guided through the guide grooves 8a and 8b of the guide plate 8 (or grooves 8a' and 8b' in case of guide plate 8') toward the distributing plate 9, and are engaged onto the shouldered portion 15' when the distributing plate has come to the end of the forward stroke (FIGS. 12 and 13). As described before, when the piston 6 has come to the end of the forward stroke, air is blown into the transfer pipes 20 under the shutter plate 18 to pneumatically transfer the four gib-headed rods supplied to the four fall openings 16 and 16' in the preceding cycle of operation to respective mounting positions.

Then, upon the start of the return stroke of the piston 6 and the distributing plate 9, the movement of the carrier plates 12 is delayed as much as the length of the elongated openings 11 with respect to the distributing plate 9, whereby the inclined edge 9b wedges in the gib-headed rods 4c and 4d to separate them and suspend them along the edges of the groove 1b in the same manner as described with respect to the gib-headed rods 4a and 4b. At the end of the return stroke, the gib-headed rods 4c and 4d are dropped into the fall openings 16' by the action of the separating guide piece 17'. At this time the four openings 19 of the shutter plate 18 are just in accordance with the four fall openings 16 and 16'. Thus, the four gib-headed rods 4a, 4b, 4c and 4d are simultaneously dropped into the transfer pipes 20. During this return stroke, the next two gib-headed rods arranged on the chute 2 are guided by the guide grooves 8d and 8c toward the distributing plate 9 and are engaged onto the shouldered portion 15 when the distributing plate has come to the end of the return stroke. Thus, the device completes one cycle of operation and is restored to the starting condition as shown in FIG. 9.

By the continuous repetition of the above-mentioned cycle of operation, the gib-headed rods are continuously supplied to predetermined mounting positions four at a same instant.

Figure 15:
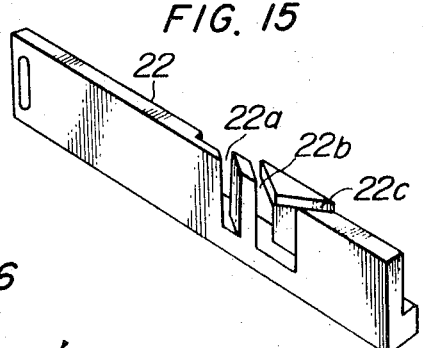
FIG. 15 is a perspective view of a guide plate for separating three gib-headed rods of a normal or smaller rod diameter.

In the above, the device was described with an embodiment for simultaneously separating and feeding four gib-headed rods. However, this embodiment can readily be modified to feed three gib-headed rods at a same instant by merely replacing the guide plate 8 or 8' by the guide plate 22 or 22' shown in FIG. 15 or 16, while changing no other parts of the device.

The guide plate 22 is so adapted as to be replaceable for the guide plate 8 which deals with gib-headed rods of a normal rod diameter or of a less rod diameter, and is provided with three guide grooves 22a, 22b and 22c. If the guide plate 22 is used in place of the guide plate 8, two gib-headed rods are separated by the grooves 22a and 22b during the forward stroke of the guide plate 22, while one gib-headed rod is separated by the groove 22c during the return stroke of the guide plate 22, and therefore, three gib-headed rods are separated and fed by each cycle of operation.

Figure 16:
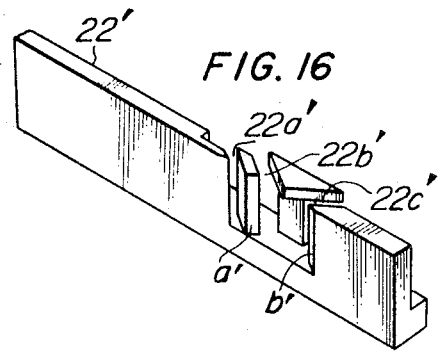
FIG. 16 is a perspective view of a guide plate for separating three gib-headed rods of a larger rod diameter.
Figure 17:
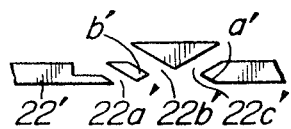
FIG. 17 is a partial plan view of the guide plate shown in FIG. 16.

In the same manner, the guide plate 22' shown in FIGS. 16 and 17 can be used in place of the guide plate 8' to separate and feed three gib-headed rods having a larger diameter at a same instant, by separating and guiding two gib-headed rods through the guide grooves 22a' and 22b' and with additional feed by the end face a' during the forward stroke of the guide plate and by separating and guiding one gib-headed rod through the guide groove 22c' and with additional feed by the end face b' during the return stroke of the guide plate.

We claim:

1. A device for separating and feeding headed rods such as screws, rivets and the like, comprising a body having formed therein a pair of substantially parallel first and second grooves and a transverse passage extending between and interconnecting said grooves, a chute for successively supplying a series of headed rods with the heads thereof resting on the tops of the opposite sidewalls of a slot in said chute, said chute extending to and communicating with said transverse passage with a substantial lower part of said sidewalls being cut off by intersection with said first groove so that a substantial part of said slot opens in one sidewall of said first groove, separating and feeding means reciprocable along said first groove past the opening of said slot in said first groove for separating a group of headed rods from the series of the rods supplied along said chute and feeding the separated rods into said passage, receiving and conveying means reciprocable along said second groove past the opening of said transverse passage in said second groove for receiving the separated rods from said passage and conveying the received rods to discharging stations located adjacent the opposite ends of said second groove.

2. A device as claimed in claim 1 in which said separating and feeding means comprises a guide plate having plurality of grooves formed therein corresponding in number to the headed rods constituting said group, said grooves being obliquely directed with respect to the longitudinal axis of said first groove, each of said oblique grooves having one sidewall operable to separate a single-headed rod from said series of rods and to feed the separated rod into said passage in each stroke of reciprocal motion of said guide plate.

3. A device as claimed in claim 2 in which at least one of the land portions defined between each adjacent pair of said oblique grooves has its end surface on the side adjacent said passage, said end surface being directed obliquely with respect to the axes of the adjacent oblique grooves to provide an additional rod-feeding surface.

4. A device as claimed in claim 1 in which said receiving and conveying means comprises a distributing plate adapted to be reciprocated along said second groove across a discharge end of said chute and provided with two notches each adapted to meet with said discharge end when said distributing plate is at each end of stroke position, a carrier plate slidably mounted on each side of said distributing plate with a slight relative movement allowed between said distributing plate and said carrier plates in the direction of reciprocation, and an auxiliary carrier member slidably mounted on each side of said distributing plate in a manner to cooperate with said carrier plates with a slight relative movement with respect to said carrier plates in the direction of reciprocation, said carrier plates and said auxiliary carrier members cooperating to define a shouldered portion for receiving and suspending at most two headed rods at each said notched portion when said notched portion has come in alignment with the discharge end of said chute, each said notched portion defining a V-shaped edge adapted to wedge in the two headed rods received in said shouldered portion to separate them from each other when said distributing plate is moved from each stroke end position due to the relative displacement between said distributing plate and said carrier plates, said shouldered portion disappearing after said edge has wedged in due to the relative displacement between said carrier plates and said auxiliary carrier members.

5. A device as claimed in claim 4 further comprising fall openings provided in the sidewalls of said second groove at each of said discharging stations, said openings each being adapted to receive one of the headed rods in one of said notched portions when said distributing plate has come to its one stroke end, and a guide piece disposed at each discharge station for separating and guiding the headed rods from said notched portion to said fall openings.

6. A device as claimed in claim 5 further comprising transfer pipes each adapted to receive a single headed rod from one of said fall openings in one cycle of operation, a shutter plate normally isolating said transfer pipes from said fall openings but adapted to establish communication therebetween when all of said openings are filled with headed rods, and air supply means for introducing compressed air into said transfer pipes when said shutter plate is closed to thereby pneumatically transfer the headed rods through said transfer pipes.

7. A device as claimed in claim 1 further comprising fluid-actuated piston means for driving both of said separating and feeding means and said receiving and conveying means.

8. A device as claimed in claim 1 in which said guide plate is formed with four oblique grooves two of which extend at an angle with respect to the axes of the remaining two grooves.

9. A device as claimed in claim 2 in which said guide plate is formed with three oblique grooves one of which extends at an angle with respect to the axes of the remaining two grooves.

10. A device as claimed in claim 1 in which said separating and feeding means comprises a guide plate having formed therein a plurality of grooves corresponding in number to the headed rods constituting said group, said grooves being obliquely directed with respect to the longitudinal axis of said first groove, each of said oblique grooves having one sidewall adapted to separate a single-headed rod from said series of rods and to feed the separated rod into said passage in each stroke of reciprocal motion of said guide plate and in which said receiving and conveying means comprises a distributing plate adapted to be reciprocated along said second groove across a discharge end of said chute and provided with two notches each adapted to meet with said discharge end when said distributing plate is at each stroke end position, carrier plate slidably mounted on each side of said distributing plate with slight relative movement between said distributing plate and said carrier plates in the direction of reciprocation, and an auxiliary carrier member slidably mounted on each side of said distributing plate in a manner to cooperate with said carrier plates with a slight relative movement with respect to said carrier plates in the direction of reciprocation, said carrier plates and said auxiliary carrier members cooperating to define a shouldered portion for receiving and suspending at most two headed rods at each said notched portion when said notched portion has come in alignment with the discharge end of said chute, each said notched portion defining a V-shaped edge adapted to wedge in the two headed rods received in said shouldered portion to separate them from each other when said distributing plate is moved from each stroke end position due to the relative displacement between said distributing plate and said carrier plates, said shouldered portion disappearing after said edge has wedged in due to the relative displacement between said carrier plates and said auxiliary carrier members.

UNITED STATES PATENT OFFICE
CERTIFICATE OF CORRECTION

Patent No. 3,587,923       Dated June 28, 1971

Inventor(s) Tamotsu TANAKA et al

It is certified that error appears in the above-identified patent and that said Letters Patent are hereby corrected as shown below:

Instead of "Matsushita Electrical Co., Ltd." the Assignee should read --MATSUSHITA ELECTRIC INDUSTRIAL CO., LTD.--.

Signed and sealed this 25th day of January 1972.

(SEAL)
Attest:

EDWARD M. FLETCHER, JR.
Attesting Officer

ROBERT GOTTSCHALK
Commissioner of Patents